(No Model.) 2 Sheets—Sheet 2.
A. BINK.
SPRING VEHICLE.
No. 376,425. Patented Jan. 17, 1888.
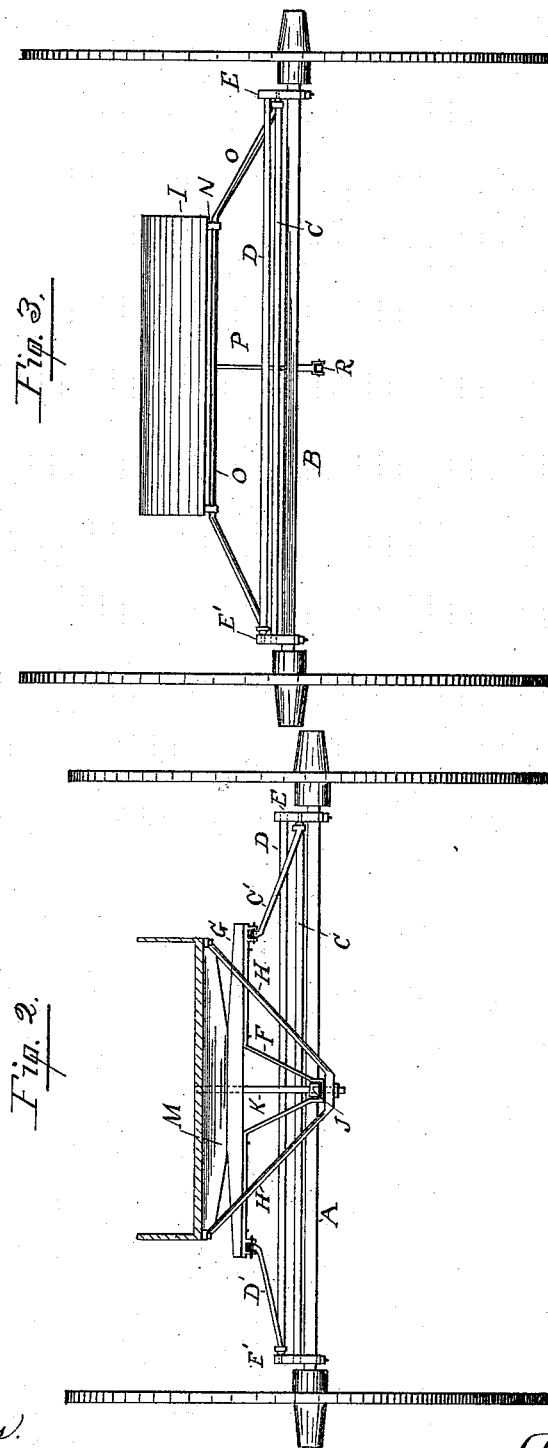
Witnesses:
Elihu B. Stowe,
T. Lewis Dennis
Inventor
Anthony Bink,
By
Joshua B. Webster Atty.

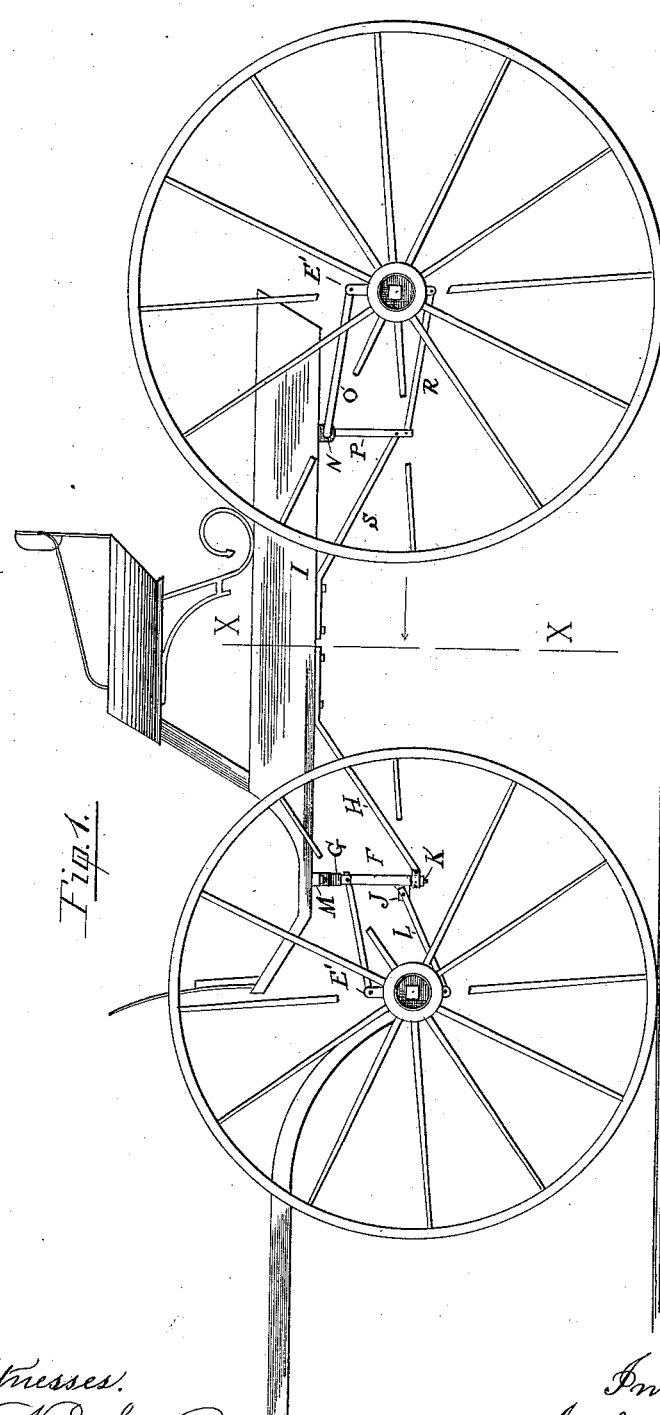

UNITED STATES PATENT OFFICE.

ANTHONY BINK, OF STOCKTON, CALIFORNIA.

SPRING-VEHICLE.

SPECIFICATION forming part of Letters Patent No. 376,425, dated January 17, 1888.

Application filed April 28, 1887. Serial No. 236,512. (No model.)

*To all whom it may concern:*

Be it known that I, ANTHONY BINK, a citizen of the United States, residing at Stockton, in the county of San Joaquin and State of California, have invented certain new and useful Improvements in Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a side elevation of a vehicle containing my improvements. Fig. 2 is a section through line X X, Fig. 1. Fig. 3 is an elevation view of the rear end.

Similar letters of reference indicate corresponding parts.

The object of my invention is to provide a vehicle that shall be strong and durable, and at the same time an easy-riding and light-weight vehicle. I accomplish this object by the use of twisting (torsion) springs attached to the axle or axles parallel therewith, and by a novel system of braces.

A is the front axle.

C and D are the front springs of the style termed "twisting," (torsion.) They may be located at any point parallel with the axle. For the purpose of illustration I have shown the springs above the axles. The springs are held in position by clip E at the right-hand and clip E' at the left-hand end of the axle, the spring D being rigidly attached at one end to a clip and the other end flexibly attached to the opposite clip, while the spring C' is oppositely attached to the clips. The spring C is connected with the head-block G by a connecting-rod, G', and the spring D to the same by a connecting-rod, D', which rods are rigidly attached each to its respective spring, and flexibly attached to the head-block by clips on the end of a \/-shaped brace, F, which is secured beneath the head-block G. The brace F connects with, at its bottom, the lower end of a \/-shaped brace, H, which at its upper ends is bolted to the bottom of the body I near its center. An iron guide, J, is placed at the intersection of the braces F and H. The king-bolt K connects them together, being inserted in its usual position through the head-block G and bolster M. A forwardly-extending brace, L, is flexibly attached to the guide J and to the axle A to hold the axle in position.

By the above system of springs, braces, and connections the body I is suspended at its front end from the axle A in such a manner as to render the vehicle very easy riding, particularly over rough roads, and is likewise strong and light. The bearings of the springs upon the axles, being near to the wheels, diverts the weight from the center of the axle, and the king-bolt, being behind the axle, aids in turning it, while permitting a shorter turn than if the body were directly over the axle.

The rear springs, C' and D, are attached to the rear clips, E and E', such clips being attached to the rear axle, B. An arch spring-brace, O, at its lower ends, is rigidly attached to the springs near the wheels, one to each spring, and at its head is flexibly attached to the bottom of the body I by the eyes N. A vertical hanger, P, is rigidly attached to the head of the spring-brace O at its center. A rearwardly-extending brace, R, is flexibly attached to the foot of the hanger P and to the center of the axle B to hold such axle in position. A forwardly-extending brace, S, is flexibly attached to the foot of the hanger P and rigidly to the bottom of the body I.

It will be seen that the attachment of the rear of the body I to the hind axle is very strong and durable, and likewise furnishes an easy-riding vehicle. The spring-brace O, extending across the bottom of the vehicle within the eyes N, permits of the rear of the body being constantly in a uniform and relatively level position.

Having thus described my invention, what I claim as new, and desire to secure by Letters Patent, is—

1. The twisting front springs, C and D, secured to the front axle, A, by the clips E and E', and to the head-block G, by means of the brace-rods C' and D', secured to clips in the ends of the \/-shaped braces F, the brace F being secured at its upper end to the head-block G, and at its lower end, by the king-bolt K, to the \/-shaped brace H, and the brace H being secured to the body I, all substantially as shown.

2. The twisting rear springs, C and D, secured to the rear axle, B, by the clips E and E', and to the rear of the vehicle-body I by the brace-rods O, such rods being suspended from the vehicle by the eyes N, the rod O, having rigidly pendent therefrom the hanger P, said hanger P being connected to the rear axle by the brace R and to the vehicle-body by the brace S, all substantially as shown and described.

3. The combination, with the braces H and F, located as shown, and with the king-bolt K, of the guide J, having the forwardly-extending brace L attached to it at its rear, and at its front end to the front axle, A, all substantially as set forth.

4. The combination, substantially as described, of the body I, the head-block G, the front braces consisting of the braces F and H, the bolster M, the king-bolt K, the guide J, the brace L, the axle A, the springs C and D, the clips E and E', and the brace-rods C' D.

In testimony whereof I affix my signature in presence of two witnesses.

ANTHONY BINK.

Witnesses:
E. BEECHER STOWE,
J. B. WEBSTER.